US011490362B2

(12) United States Patent
Zhang et al.

(10) Patent No.: US 11,490,362 B2
(45) Date of Patent: Nov. 1, 2022

(54) VEHICULAR COMMUNICATIONS PACKET REPETITION

(71) Applicant: NXP USA, INC., Austin, TX (US)

(72) Inventors: Hongyuan Zhang, Fremont, CA (US); Rui Cao, Sunnyvale, CA (US); Yan Zhang, Palo Alto, CA (US); Liwen Chu, San Ramon, CA (US)

(73) Assignee: NXP USA, Inc., Austin, TX (US)

( * ) Notice: Subject to any disclaimer, the term of this patent is extended or adjusted under 35 U.S.C. 154(b) by 57 days.

(21) Appl. No.: 17/012,702

(22) Filed: Sep. 4, 2020

(65) Prior Publication Data

US 2021/0076356 A1 Mar. 11, 2021

Related U.S. Application Data

(60) Provisional application No. 62/897,142, filed on Sep. 6, 2019.

(51) Int. Cl.
*H04W 72/00* (2009.01)
*H04L 1/18* (2006.01)
(Continued)

(52) U.S. Cl.
CPC .......... *H04W 72/005* (2013.01); *H04L 1/189* (2013.01); *H04W 4/44* (2018.02); *H04W 72/0466* (2013.01)

(58) Field of Classification Search
CPC .......... H04W 4/06; H04W 4/40; H04W 4/44; H04W 4/46; H04W 4/48; H04W 4/027;
(Continued)

(56) References Cited

U.S. PATENT DOCUMENTS 10,135,582 B1 11/2018 Sun et al.
2012/0113838 A1* 5/2012 Lim ................... H04B 7/15507
370/252

(Continued)

FOREIGN PATENT DOCUMENTS

EP 3876445 A1 9/2021

OTHER PUBLICATIONS

U.S. Appl. No. 16/888,139, filed May 29, 2020, entitled: Radar Apparatus and Method. The Examiner is referred to the copending patent prosecution of the common Applicant (no attachment).

(Continued)

*Primary Examiner* — Peter Chen

(57) ABSTRACT

Certain specific examples are directed to or involve a plurality of vehicular communication stations including a first type and a second type which communicate over a shared communications channel characterized by a common RF frequency band. The stations may also include at least one of the plurality of vehicular communication stations broadcasting a set of vehicle-specific data over the shared communication channel for reception by the first type according to a first wireless communication protocol and concurrently for reception by the second type according to a second different wireless communication protocol. The broadcast may include a plurality of repetitive consecutive transmissions of the set of vehicle-specific data which may allow for improved range extension and reliability. Each of the repetitive consecutive transmissions may be formatted consistent with the first wireless communication protocol.

22 Claims, 2 Drawing Sheets

(51) Int. Cl.
*H04W 72/04* (2009.01)
*H04W 4/44* (2018.01)

(58) Field of Classification Search
CPC ..... H04W 76/14; H04W 76/15; H04W 76/40; H04W 72/005; H04W 72/0406; H04W 72/0466; H04W 74/0816; H04W 88/02; H04W 88/06; H04W 84/10; H04W 84/12; H04W 84/005; H04W 92/16; H04W 92/18; H04W 8/24; H04W 40/026; H04W 40/20; H04L 1/188; H04L 1/189; H04L 1/1845; H04L 1/1829; H04L 2001/0093
See application file for complete search history.

(56) References Cited

U.S. PATENT DOCUMENTS

| | | | |
|---|---|---|---|
| 2016/0277196 A1* | 9/2016 | Jose | H04L 12/1845 |
| 2019/0280919 A1* | 9/2019 | Sadeghi | H04L 41/0803 |
| 2020/0015111 A1 | 1/2020 | Martinez et al. | |
| 2020/0106563 A1* | 4/2020 | Akoum | H04L 1/08 |
| 2020/0162587 A1 | 5/2020 | Martinez et al. | |
| 2021/0314750 A1* | 10/2021 | Nguyen | H04W 4/46 |

OTHER PUBLICATIONS

U.S. Appl. No. 17/006,982, filed Aug. 31, 2020, entitled: Wireless Communication With Time-Delay Repetition Detection. The Examiner is referred to the copending patent prosecution of the common Applicant (no attachment).

U.S. Appl. No. 17/006,998, filed Aug. 31, 2020, entitled: Wireless Communication With Repetition Detection. The Examiner is referred to the copending patent prosecution of the common Applicant (no attachment).

U.S. Appl. No. 16/445,924, filed Jun. 19, 2019 entitled: Systems and Methods Involving Interference Cancellation. The Examiner is referred to the copending patent prosecution of the common Applicant (no attachment).

U.S. Appl. No. 16/829,254, filed Mar. 25, 2020 entitled: Wireless Communication With Channel Suppression. The Examiner is referred to the copending patent prosecution of the common Applicant (no attachment).

U.S. Appl. No. 16/711,707, filed Dec. 12, 2019 entitled: Wireless Vehicular Communications With Channel Allocation. The Examiner is referred to the copending patent prosecution of the common Applicant (no attachment).

* cited by examiner

VEHICULAR COMMUNICATIONS PACKET REPETITION

OVERVIEW

Aspects of various embodiments are directed to vehicle (automobile) communication stations broadcasting vehicle specific data over a shared communications channel.

Data communication between automobile vehicles helps to improve road safety. In these communications systems, vehicles may act like sensors and transmit warning messages to other vehicles in communication range or receive messages from other vehicles. Drivers can easily detect any abnormal or potentially dangerous situations, such as traffic accidents and traffic jam, by receiving telematics information, including location and speed information. Communication between vehicles and infrastructures may include road side units that may transmit commercial advertisements, vehicles can pay toll or parking payments, and so forth. Reception of this data may, at times, be difficult due to changing interferences and distances, significant amount of radio transmissions in high traffic areas, etc.

These and other matters have presented challenges to efficiencies of vehicle communications systems implementations, for a variety of applications.

SUMMARY

Various example embodiments are directed to issues such as those addressed above and/or others which may become apparent from the following disclosure concerning automobile-type vehicle communications, such as vehicle-to-vehicle data transmission and/or vehicle-to-station data transmission. Such communications may be disrupted due to various forms of interference, low signal strength due to extended distances, etc. To mitigate such communications issues, it is desirable to enhance the performance of automobile-type vehicle communications in terms of communications throughput and communications range.

In certain example embodiments, aspects of the present disclosure involve automobile-type vehicle communications with repetition transmission and backward compatibility to existing vehicle-to-vehicle and vehicle-to-station transmission stations.

In a more specific example, embodiments are directed to or involve a plurality of vehicular communication entities (i.e., referring to wireless communication circuitry traveling and/or fixed on or along the roadside and relative to at least one vehicle), with the entities being of a first type and a second type to communicate over a shared communications channel. At least one of the plurality of vehicular communication entities may be broadcasting a set of vehicle-specific data over the shared communication channel for reception by the first type according to a first wireless communication protocol and concurrently for reception by the second type according to a second different wireless communication protocol. The broadcast may include a plurality of repetitive consecutive transmissions of the set of vehicle-specific data which may allow for improved range extension and reliability. Each of the repetitive consecutive transmissions may be formatted consistent with the first wireless communication protocol.

Also although not appropriate for all implementations, each repetitive consecutive transmission pair may have interleaved spacing (e.g., with a time gap inserted between sequentially-sent data units) defined according to the second different wireless communication protocol. The spacing may be provided to block other concurrent transmissions by the plurality of vehicular communication stations and to mitigate communication collisions on the shared communication channel. In more specific embodiments, such spacing between two repetitive transmissions is a fixed constant.

Another specific example embodiment is directed to a transceiver (such as above) to broadcast repetitive sequential transmissions, as described previously, over the shared communication channel for reception by the first type according to a first wireless communication protocol and concurrently for reception by the second type according to a second different wireless communication protocol.

Other specific example embodiments involve broadcasting the plurality of repetitive consecutive transmissions of the set of vehicle-specific data including repetitively broadcasting the set of vehicle-specific data N times, where N is an integer greater than one and not more than several (e.g., four, five and not more than seven). Also, the second different wireless communication protocol may provide the aforesaid at least one vehicular communication station of the first type to receive and process, statistically, the set of vehicle-specific data N chances.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
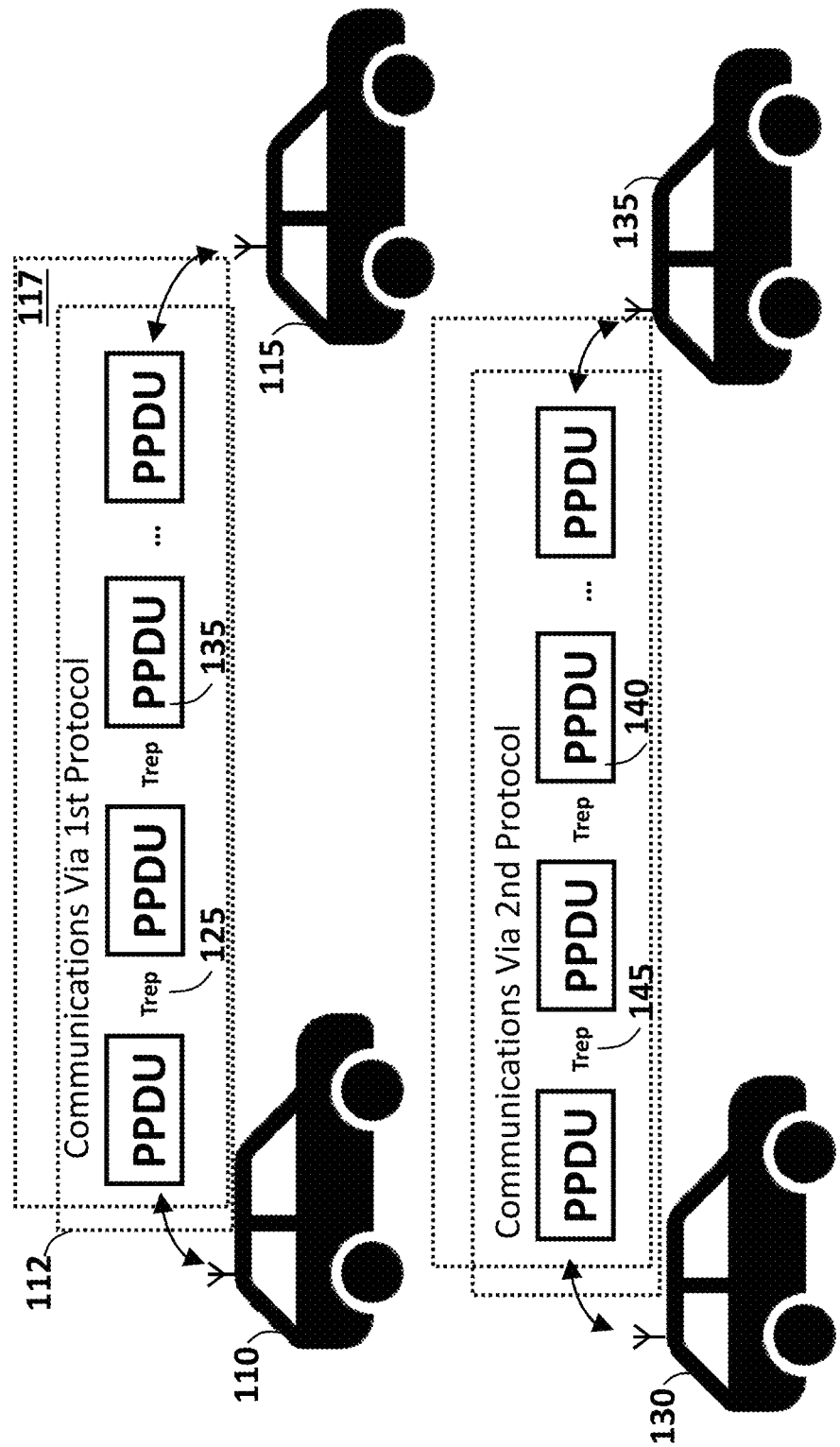
FIG. 1 is a system-level diagram illustrating an example of a first set of two vehicles communication via a first wireless protocol and a second set of two vehicles communication via a second wireless protocol, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving NGV (Next Generation V2X-802.11bd) communications devices, including vehicles and other communications stations. In certain implementations, aspects of the present disclosure have been shown to be beneficial when used in the context of NGV communications devices, including vehicles and other stations, to gain range extension and reliability. Along with these improvements, it is also desirable to allow for backwards compatibility to earlier systems using 802.11p protocols. Some embodiments of the present disclosure may improve RF reception using a method of repetition in the PPDU (Physical Protocol Data Unit) format of 802.11p transmission and reception to enhance the 802.11p and NGV station's reception reliability. Also, the instant disclosure extends the repetition method to the NGV PPDU, while allowing for backward compatibility to the 802.11p based systems. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given herein. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

According to specific examples of the present disclosure, embodiments are directed to or involve a plurality of vehicular communication stations. The stations may include a first type and a second type which communicate over a shared communications channel characterized by a common RF frequency band. The stations may also include at least one of the plurality of vehicular communication stations broadcasting a set of vehicle-specific data over the shared communication channel for reception by the first type according to a first wireless communication protocol and concurrently for reception by the second type according to a second different wireless communication protocol. The broadcast may include a plurality of repetitive consecutive transmissions of the set of vehicle-specific data which may allow for improved range extension and reliability. Each of the repetitive consecutive transmissions may be formatted consistent with the first wireless communication protocol. Also, each repetitive consecutive transmission pair may have interleaved spacing defined according to the second different wireless communication protocol so as to separate each repetitive consecutive transmission pair. The spacing may be provided to block other concurrent transmissions by the plurality of vehicular communication stations and to mitigate communication collisions on the shared communication channel. In specific examples wherein the spacing is fixed, the spacing may be referred to as $T_{rep}$ in such examples of the current disclosure.

Another specific example is directed to or involves a transceiver to broadcast repetitive sequential transmissions, as described previously, over the shared communication channel for reception by the first type according to a first wireless communication protocol and concurrently for reception by the second type according to a second different wireless communication protocol.

Turning now to the drawings, FIG. 1 illustrates an example of a first set of two vehicles communication via a first wireless protocol and a second set of two vehicles communication via a second wireless protocol. As seen in FIG. 1, a first vehicle 110 is shown as communicating with a second vehicle 115 using a first communications protocol.

The first and second vehicles 110 and 115 includes respective radio receiver circuits 112 and 117, respectively, depicting RF (radio frequency) front-end circuitry and processing logic (e.g., with programmable logic array(s) and/or CPU programmed as described herein). As an example, the first communications protocol may be the 802.11p protocol, an IEEE standard defining a protocol for vehicle to vehicle and vehicle to infrastructure (V2I, or alternatively V2X) communication.

Also, in in FIG. 1, a third vehicle 130 is shown as communicating with a fourth vehicle 135 using a second communications protocol, each via respective radio receiver circuits as circuits 112 and 117 programmed for communication via the second communications protocol, or via the second communications protocol as well as the first communications protocol. As an example, the second communications protocol may be the 802.11bd protocol, an IEEE standard defining a protocol for vehicle to vehicle and vehicle to infrastructure communication. 802.11bd, next-generation vehicular (NGV) communications, defines technologies to enhance the performance of 802.11p in terms of throughput and range. 802.11bd maintains backwards compatibility with 802.11p data communications as the first communications protocol. As such, vehicles equipped with an 802.11p communication system are able to communicate with other vehicles equipped with an 802.11p communication system or another vehicle equipped with an 802.11bd communication system.

The first communications protocol in FIG. 1 is illustrated as transmitting a repetitive transmission. Such a repetition consists of a plurality of PPDUs (Physical Protocol Data Unit) 135 separated by a time gap of $T_{rep}$ 125. If $T_{rep}$ is less than or equal to the SIFS (Short Inter-frame Space) time, there should not be any other traffic transmitting in between repetitions of the PPDU according to communication protocol regulations.

Similarly, the second communications protocol in FIG. 1 is illustrated as transmitting a repetitive transmission. Such a repetition consists of a plurality of PPDUs (Physical Protocol Data Unit) 140 separated by a time gap of $T_{rep}$ 145. Note that if Trep is less than or equal to the SIFS (Short Inter-frame Space) time, there should not be other traffic coming in between repetitions of the PPDU and therefore, no signaling of repetitions in needed.

As an alternate method of repetition, MAC (media access control) signaling to indicate the repetition mode may be used. This may be implemented, for example, by defining a specific duration values to indicate duplicate transmission, and/or whether more repetitive transmissions are expected for the following broadcast frames. The number of PPDU 135 and 140 repetitions (N) may be determined in various ways. For example, N may be a fixed number in the communications system. Alternately, N may be dynamically determined. Such a repetition adaptation may select N based on data such as traffic load in the surrounding area, the number of not-acknowledged messages received in response to a broadcast, and/or the relative numbers of the first type and the second type of vehicular communication stations in the area.

Figure 2:
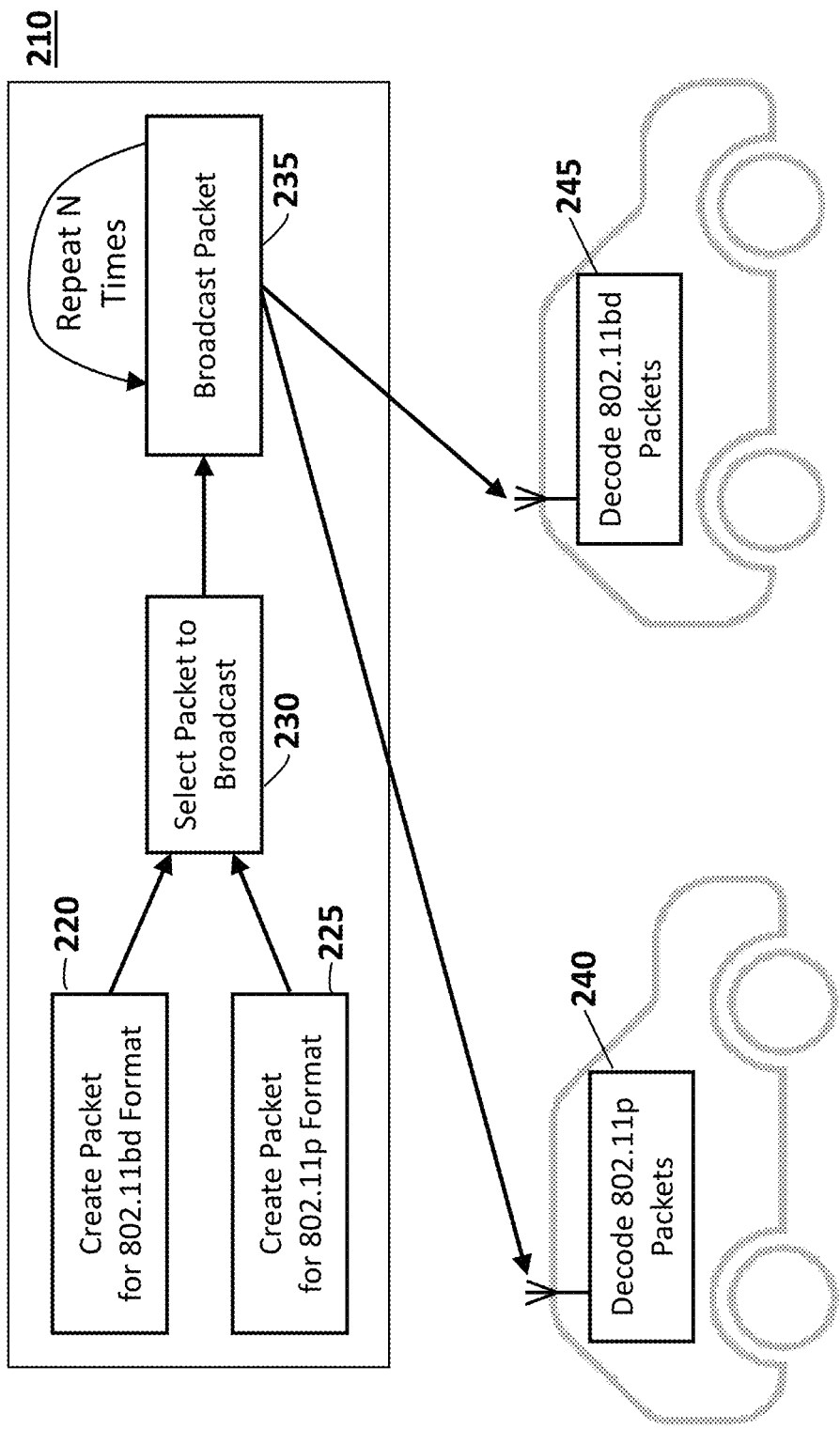
FIG. 2 is a system-level diagram illustrating an example of a repetition transmission being sent to, and received by, an IEEE 802.11p receiver as for one wireless protocol and an IEEE 802.bd receiver as for another wireless protocol, in accordance with the present disclosure.

FIG. 2 illustrates illustrating an example of a repetition transmission being sent to, and received by, an 802.11p receiver and an 802.bd receiver. Communications station 210 may create data packets in one or both of 802.11bd format 220 and 802.11p format 225. It will be appreciated that communications station 210, in examples discussed herein, is also referred to as a transceiver including one or more antennas coupled to radio frequency signal transmitterreceiver circuitry and equipped to communicate, for example, in one or both 802.11bd and 802.11p formats. At block 230, the next packet is selected to send based on decision logic consistent with conventional communication sequences for such format(s), for example, as may be performed by a CPU which is part of the transceiver. The selected packet, 220 or 225, is sent to the broadcast packet block 235. The broadcast packet block 235 transmits the selected packet, 220 or 225, and repeats the broadcast of the packet N times, wherein N is determined and as described elsewhere in the present disclosure.

FIG. 2 also illustrates the reception of the repeated broadcast by two communications stations, 240 and 245. Communications station 240 is illustrated as receiving the 802.11p repetition transmission from communications station 210. As each station is capable of receiving an 802.11p transmission, the communications station 240 may either be an 802.11db receiver capable of receiving an 802.11p or an 802.11bd transmission, or an 802.11p communications station capable of receiving an 802.11p transmission. Communications station 245 is illustrated as receiving the 802.11db repetition transmission from communications station 210, indicative of station 210 being a type configured for 802.11bb communications.

In one specific example, embodiments are directed to methods involving each of at least one vehicular communication station of the second type combining at least two of the plurality of repetitive sequential transmissions of the set of vehicle-specific data.

According to yet other specific examples of the present disclosure, each of at least one vehicular communication station of the second type may recognize at least two of the plurality of repetitive sequential transmissions of the set of vehicle-specific data. Recognition and successful reception of the transmissions is enabled by the spacing defined according to the second different wireless communication protocol.

In certain more specific examples, a method involves combining at least two of the plurality of repetitive sequential transmissions to provide the set of vehicle-specific data with an increased signal quality, for at least one of signal integrity and signal reception range, relative to not combining the set of vehicle-specific data.

Yet another example involves combining at least two of the plurality of repetitive sequential transmissions to provide the set of vehicle-specific data with an increased signal quality for at least one of signal integrity and signal reception range, relative to not combining the set of vehicle-specific data. Signal improvement of received transmissions may be achieved using the well understood method of repetition coding. In order to transmit a message over a noisy channel that may corrupt the transmission in a few places, the idea of the repetition code is to just repeat the message several times. The desire is that the channel corrupts only a minority of these repetitions. This way the receiver may notice that a transmission error occurred since the received data stream is not the repetition of a single message, and moreover, the receiver may recover the original message by looking at the received message in the data stream that occurs most often. For improving signal reception using repetition, maximum-ratio combining (MRC) may be used. MRC involves adding the repeated transmissions together at the receiver to provide a resultant signal with an improved signal-to-noise ratio.

In another example, the step of broadcasting the plurality of repetitive consecutive transmissions of the set of vehicle-specific data may include broadcasting the set of vehicle-specific data at least two consecutive times and not more than several times. In a related example, the broadcasting may involve transmitting the set of vehicle-specific data at least two consecutive times and not more than four times, with the particular number of repetitions being fixed or dynamic and depending on one or more factors as discussed below.

According to another specific example of the present disclosure, embodiments are directed to or involve vehicle communications stations wherein the common frequency band includes 5.9 Gigahertz. Also, each of the first wireless communication protocol and the second different wireless communication protocol may be a WiFi protocol for communications between a plurality of automobile stations (e.g., fixed along the roadside and/or secured in a vehicle for travel), with at least one of the plurality of automobile stations being installed in an automobile.

In another embodiment, the second different wireless communication protocol may be compatible with the first wireless communication protocol. As such, at least one vehicular communication station of the first type receives and processes a certain one of the plurality of repetitive sequential transmissions of the set of vehicle-specific data. Other than the aforesaid certain one, other ones of the plurality of repetitive sequential transmissions are transparent to or ignored by the aforesaid at least one vehicular communication station of the first type.

According to specific examples of the present disclosure, embodiments are directed to or involve methods wherein the step of broadcasting the plurality of repetitive consecutive transmissions of the set of vehicle-specific data includes broadcasting the set of vehicle-specific data N times, wherein N is an integer greater than one and not more than several (e.g., up to 4, 5, 6, or 7). Also, the second different wireless communication protocol may provide the aforesaid at least one vehicular communication station of the first type to receive and process, statistically, the set of vehicle-specific data N chances.

Yet further aspects, according to the present disclosure, are directed to the vehicular communication stations sending such repetitive sequential transmissions using a scrambler seed that is common to each repetitive transmission. To allow the receiving station to combine the repetitive transmissions to decoding, the repeated information may need to have the same scrambler initialization/seed.

Yet another example of the present disclosure involves a method that includes using the scrambler seed for the transmissions that is common to each repetitive transmission and using the common seed to decode the broadcasted set of vehicle-specific data. This may be used to provide, for each or representative ones of the plurality of repetitive consecutive transmissions of the set of vehicle-specific data, samples of formatted energy. The method may also involve combining the samples of formatted energy to provide the set of vehicle-specific data with an increased signal quality for signal integrity and/or signal reception range. Such increase in signal quality is measured relative to not combining the set of vehicle-specific data. One example method of combining that may be employed is Maximal Ratio Combining (MRC).

Another example embodiment involves a method wherein, for each of the at least one of the plurality of vehicular communication stations broadcasting a set of vehicle-specific data over the shared communication channel, the broadcasted set of vehicle-specific data may include, but is not limited to, a header, a trailer, and a payload. The payload may carry a plurality of time-sensitive information items of an associated vehicle. One of the items may include spatial-temporal location information and another item(s) may include vehicle status information relative to an automobile route.

Another example involves a method wherein, for each of the at least one of the plurality of vehicular communication stations broadcasting a set of vehicle-specific data over the shared communication channel, the broadcasted set of vehicle-specific data includes payload information. Such information may include information categories established by a data-communications service provider to facilitate communications for the broadcasting of the set of vehicle-specific data. Vehicle-specific data may include, but is not limited to, such items as hazard warnings, road conditions, traffic state, local weather, and road topology.

According to another specific example of the present disclosure, the broadcasting of vehicular communication stations may use repetitive transmission diversity. Such repetitive transmission diversity may include one or more of the following: a) providing an artificial gain for multiple ones of the broadcasted plurality of repetitive consecutive transmissions of the set of vehicle-specific data; b) different spatial mapping for multiple antennas and; c) unique time shift in the time or linear phase in frequency domain being added for each of the multiple antennas (e.g., CSD or cyclic shift diversity). In artificial gains, the artificial channel gain $G(i, k)$ may be applied on each tone k and may be varied for each transmission (i). In spatial mapping, for the $i^{th}$ transmission of the plurality of N transmissions, a different spatial mapping $Q_{i,k}$ is applied on tone k. For blind spatial mapping, $Q(i,k)$ may be the same for all tones k, but different across transmissions. When applying artificial diversity using cyclic shift diversity, different antenna CSD patterns may be applied per transmission. Alternately, each transmission may use the same CSD but a different phase may be applied across each antenna.

Yet another example involves the broadcasting of the plurality of repetitive consecutive transmissions of the set of vehicle-specific data including broadcasting the set of vehicle-specific data N times, wherein N is a fixed integer greater than one and not more than several.

Further aspects, according to the present disclosure, are directed to the step of broadcasting the plurality of repetitive consecutive transmissions of the set of vehicle-specific data including broadcasting the set of vehicle-specific data N times, with N being an integer greater than one and not more than several (e.g., a number from 2 to 7), may be set dynamically based on at least one or any combination of the following factors: a) traffic load in an area around a location relative to where the broadcasting occurs; b) a function of a relative numbers of the first type and the second type of the plurality of vehicular communication stations at a location relative to where the broadcasting occurs; and c) a number of not-acknowledged messages received in response to the broadcasting Another embodiment involves an apparatus used by a communications station for use in a vehicle that is to communicate with a plurality of vehicular communication stations of a first type over a shared communication channel characterized by a common frequency band, and a different second communicating type of vehicular communication station for communicating with the plurality of vehicular communication stations. The different second communicating type of vehicular communication station may be comprised of front-end radio-frequency reception circuitry to receive a broadcast of a set of vehicle-specific data over the shared communication channel according to a repetitive-transmission wireless communication protocol that is compatible with another wireless communication protocol used by the first type of the plurality of vehicular communication stations The second communicating type of vehicular communication station may also facilitate the broadcast of the set of vehicle-specific data including a plurality of repetitive consecutive transmissions of the set of vehicle-specific data. Each of the data (or data sets) may be formatted consistent with the repetitive-transmission wireless communication protocol and with the other wireless communication protocol and each consecutive pair. Each consecutive pair may have spacing defined according to the repetitive-transmission wireless communication protocol. This spacing may be used to block other concurrent transmissions by the plurality of vehicular communication stations so as to mitigate communication collisions on the shared communication channel. Also, one of the plurality of repetitive sequential transmissions of the set of vehicle-specific data is directed or formatted for at least one vehicular communication station of the first type and at least two of the plurality of repetitive sequential transmissions of the set of vehicle-specific data is directed or formatted for at least one vehicular communication station of the different second communicating type of vehicular communication station.

According to specific examples of the present disclosure, embodiments are directed to or involve a method employed by the different second communicating type of vehicular communication station of the previous example(s). In such an example approach, the front-end radio-frequency reception circuitry may receive the broadcast of the set of vehicle-specific data over the shared communication channel according to the repetitive-transmission wireless communication protocol. In connection with specific examples, the Specification describes and/or illustrates aspects useful for implementing the claimed disclosure by way of various circuits or circuitry which may be illustrated as or using terms such as blocks, modules, device, system, unit, controller and/or other circuit-type depictions (e.g., reference numerals 112, 117 of FIG. 1, and reference numerals 220 and 230 of FIG. 2 depict a block/module as described herein). Such circuits or circuitry are used together with other elements to exemplify how certain embodiments may be carried out in the form or structures, steps, functions, operations, activities, etc.

For example, in certain of the above-discussed embodiments, one or more modules are discrete logic circuits or programmable logic circuits configured and arranged for implementing these operations/activities, as may be carried out in the approaches shown in FIG. 2. In certain embodiments, such a programmable circuit is one or more computer circuits, including memory circuitry for storing and accessing a program to be executed as a set (or sets) of instructions (and/or to be used as configuration data to define how the programmable circuit is to perform). Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are merely used for English-language antecedence to differentiate one such similarly-named structure from another similarly-named structure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims

What is claimed is:

1. A method comprising:
   broadcasting, by at least one of a plurality of vehicular communication stations including a first type and a different second type communicating over a shared communication channel characterized by a common frequency band, a set of vehicle-specific data over the shared communication channel for reception by a vehicular communication station with the first type according to a first wireless communication protocol and concurrently for reception by a vehicular communication station with the different second type according to a second different wireless communication protocol; and
   wherein the broadcasting of the set of vehicle-specific data including a plurality of repetitive sequential transmissions of the set of vehicle-specific data, each transmission is formatted consistent with the first wireless communication protocol and the second wireless communication protocol and each consecutive pair of transmissions has spacing between each two sequential transmissions of the pair defined according to only the second different wireless communication protocol to block other concurrent transmissions by the plurality of vehicular communication stations and to mitigate communication collisions on the shared communication channel, wherein the plurality of repetitive sequential transmissions of the set of vehicle-specific data is received by the vehicular communication stations, only one transmission of the plurality of repetitive sequential transmissions of the set of vehicle-specific data is processed by at least one vehicular communication station of the first type to recover the set of vehicle-specific data, and at least two transmissions of the plurality of repetitive sequential transmissions of the set of vehicle-specific data is processed by at least one vehicular communication station of the different second type to recover the set of vehicle-specific data, wherein the first wireless communication protocol is 802.11p and the second different wireless communication protocol is based on 802.11bd.

2. The method of claim 1, wherein the broadcasting is by a transceiver and over the shared communication channel for reception by the first type according to the first wireless communication protocol and concurrently for reception by the second type according to the second different wireless communication protocol.

3. The method of claim 1, further including each of said at least one vehicular communication station of the second type combining said at least two transmissions of the plurality of repetitive sequential transmissions of the set of vehicle-specific data.

4. The method of claim 1, further including each of said at least one vehicular communication station of the second type recognizing said at least two transmissions of the plurality of repetitive sequential transmissions of the set of vehicle-specific data at least in response to said spacing defined according to the second different wireless communication protocol.

5. The method of claim 1, further including each of said at least one vehicular communication station of the second type recognizing that said at least two transmissions of the plurality of repetitive sequential transmissions of the set of vehicle-specific data are in accordance with the second different wireless communication protocol and then combining said at least two transmissions of the plurality of repetitive sequential transmissions of the set of vehicle-specific data.

6. The method of claim 1, further including each of said at least one vehicular communication station of the second type recognizing said at least two transmissions of the plurality of repetitive sequential transmissions of the set of vehicle-specific data at least in response to said spacing defined according to the second different wireless communication protocol, and wherein combining said at least two transmissions of the plurality of repetitive sequential transmissions to provide the set of vehicle-specific data with an increased signal quality, for at least one of signal integrity and signal reception range, relative to not combining the set of vehicle-specific data.

7. The method of claim 1, wherein the step of broadcasting the plurality of repetitive sequential transmissions of the set of vehicle-specific data includes broadcasting the set of vehicle-specific data at least two consecutive times and not more than four times.

8. The method of claim 1, wherein the common frequency band includes 5.9 Gigahertz, and each of the first wireless communication protocol and the second different wireless communication protocol is a WiFi protocol for communications between a plurality of automobile stations, at least one of the plurality of automobile stations being installed in an automobile.

9. The method of claim 1, wherein the second different wireless communication protocol is compatible with the first wireless communication protocol, and said at least one vehicular communication station of the first type receives and processes a certain one transmission of the plurality of repetitive sequential transmissions of the set of vehicle-specific data and, other than said certain one transmission, other ones of the plurality of repetitive sequential transmissions are transparent to or ignored by said at least one vehicular communication station of the first type.

10. The method of claim 1, wherein the step of broadcasting the plurality of repetitive sequential transmissions of the set of vehicle-specific data includes broadcasting the set of vehicle-specific data N times, wherein N is an integer greater than one and not more than several, and wherein the second different wireless communication protocol provides said at least one vehicular communication station of the first type to receive and process, statistically, the set of vehicle-specific data N chances.

11. The method of claim 1, further including each of said at least one vehicular communication station of the second type combining and processing said at least two transmissions of the plurality of repetitive sequential transmissions of the set of vehicle-specific data by using a scrambler seed, that is common to each of the transmissions, to decode data in the transmissions.

12. The method of claim 1, further including processing, based on a sequential transmissions using a scrambler seed, to decode the broadcasted set of vehicle-specific data and to provide, for said plurality of repetitive sequential transmissions of the set of vehicle-specific data, samples of formatted energy, and then combining the samples of formatted energy to provide the set of vehicle-specific data with an increased signal quality, for at least one of signal integrity and signal reception range, relative to not combining the set of vehicle-specific data.

13. The method of claim 1, wherein, for each of the at least one of the plurality of vehicular communication stations broadcasting the set of vehicle-specific data over the shared communication channel, the broadcasted set of vehicle-specific data includes a header, a trailer, and a payload, wherein the payload carries a plurality of time-sensitive information items of an associated vehicle, wherein one of the plurality of time-sensitive information items including spatial-temporal location information and another of the plurality of time-sensitive information items including vehicle status information relative to an automobile route.

14. The method of claim 1, wherein, for each of the at least one of the plurality of vehicular communication stations broadcasting the set of vehicle-specific data over the shared communication channel, the broadcasted set of vehicle-specific data includes payload information including information categories established by a data-communications service provider to facilitate communications for the broadcasting of the set of vehicle-specific data.

15. The method of claim 1, wherein the broadcasting uses repetitive transmission diversity.

16. The method of claim 1, wherein the broadcasting uses repetitive transmission diversity including using one or both of the following: providing an artificial gain for multiple ones of the broadcasted plurality of repetitive sequential transmissions of the set of vehicle-specific data; and via multiple antennas, a unique time shift in the time or linear phase in frequency domain being added for each of the multiple antennas.

17. The method of claim 1, wherein the step of broadcasting the plurality of repetitive sequential transmissions of the set of vehicle-specific data includes broadcasting the set of vehicle-specific data N times, wherein N is a fixed integer greater than one and not more than several.

18. The method of claim 1, wherein the step of broadcasting the plurality of repetitive sequential transmissions of the set of vehicle-specific data includes broadcasting the set of vehicle-specific data N times, wherein N being an integer greater than one and not more than several, is set dynamically based on at least one or any combination of the following: traffic load in an area around a location relative to where the broadcasting occurs; a function of a relative numbers of the first type and the second type of the plurality of vehicular communication stations at a location relative to where the broadcasting occurs; and a number of not-acknowledged messages received in response to the broadcasting.

19. The method of claim 1, wherein the spacing between transmissions is less than or equal to a short inter-frame space time.

20. For use in a vehicle that is to communicate with a plurality of vehicular communication stations of a first type over a shared communication channel characterized by a common frequency band, a vehicular communication station of a different second communicating type for communicating with the plurality of vehicular communication stations, the vehicular communication station of the different second communicating type comprising:
front-end radio-frequency reception circuitry to receive a broadcast of a set of vehicle-specific data over the shared communication channel according to a repetitive-transmission wireless communication protocol that is compatible with another wireless communication protocol used by the first type of the plurality of vehicular communication stations; and
the broadcast of the set of vehicle-specific data including a plurality of repetitive sequential transmissions of the set of vehicle-specific data, each transmission is formatted consistent with the repetitive-transmission wireless communication protocol and with the other wireless communication protocol and each transmission of a consecutive pair of transmissions has spacing defined according to only the repetitive-transmission wireless communication protocol to block other concurrent transmissions by the plurality of vehicular communication stations to mitigate communication collisions on the shared communication channel, wherein the plurality of repetitive sequential transmissions of the set of vehicle-specific data is received by the vehicular communication stations, only one transmission of the plurality of repetitive sequential transmissions of the set of vehicle-specific data is processed by at least one vehicular communication station of the first type to recover the set of vehicle-specific data and at least two transmissions of the plurality of repetitive sequential transmissions of the set of vehicle-specific data is processed by at least one vehicular communication station of the different second communicating type to recover the set of vehicle-specific data, wherein the other communication protocol is 802.11p and the repetitive-transmission wireless communication protocol is based on 802.11bd.

21. The vehicular communication station of the different second communication type of claim 20, wherein the front-end radio-frequency reception circuitry is to receive the broadcast of the set of vehicle-specific data over the shared communication channel according to the repetitive-transmission wireless communication protocol.

22. The vehicular communication station of the different second communication type of claim 20, wherein the spacing between transmission is less than or equal to a short inter-frame space time.

* * * * *